United States Patent
Uchida et al.

[15] 3,692,048
[45] Sept. 19, 1972

[54] APPARATUS FOR CONTROLLING A MASS FLOW RATE OF LIQUID IN A CHEMICAL PROCESS

[72] Inventors: Mitsuo Uchida, 14-232, Kasuga 3-chome, Ibaragi-shi, Osaka; Tadanao Iketani, A3-310, 3-1, Tsukumodai, Suita-shi, Osaka; Naoyuki Mitani, 1-4, Sakaemachi, Otsu-shi, Shiga-ken, all of Japan

[22] Filed: March 31, 1971

[21] Appl. No.: 129,957

Related U.S. Application Data

[63] Continuation of Ser. No. 853,168, Aug. 26, 1969, abandoned.

[30] Foreign Application Priority Data

Aug. 29, 1968 Japan .................... 43/61980

[52] U.S. Cl. .................................................. 137/403
[51] Int. Cl. .......................................... D06f 39/00
[58] Field of Search........137/386.391, 395.403, 406; 73/296

[56] References Cited

UNITED STATES PATENTS

| | | | |
|---|---|---|---|
| 2,899,969 | 8/1959 | Kirby | 137/403 X |
| 3,051,192 | 8/1962 | Fagot et al. | 137/403 X |
| 3,058,043 | 10/1962 | Schroeder | 137/403 X |
| 3,200,971 | 8/1965 | Trethwey | 137/403 X |

*Primary Examiner*—M. Cary Nelson
*Assistant Examiner*—David R. Matthews
*Attorney*—Robert E. Burns and Emmanuel J. Lobato

[57] ABSTRACT

An improved apparatus for controlling a mass flow rate of liquid in a chemical process, wherein a control system for regulating a mass flow rate of liquid in a liquid passage of the process is automatically controlled in accordance with a deviation between a reference input of mass flow rate of liquid, and an average mass flow rate of liquid measured by a particularly designed measuring device. The measuring device is provided with a liquid container which is disposed in a liquid passage of the process and supported by a weighing mechanism. An opening or closing means and an automatic means for regulating the mass flow rate of liquid are mounted separately on the liquid passage at both opposed sides of the liquid container respectively, and the automatic regulating means is actuated as mentioned above. After opening or closing the opening or closing means, a weight difference $\Delta W$ of liquid contained in the liquid container is measured at two measuring instances which are separated by a time interval $\Delta T$, then the average mass flow rate of the liquid is integrally calculated by an equation ($\Delta W/\Delta T$). The measuring of the liquid weight is carried out together with measuring the net weight of the liquid container by way of the weighing mechanism.

11 Claims, 14 Drawing Figures

APPARATUS FOR CONTROLLING A MASS FLOW RATE OF LIQUID IN A CHEMICAL PROCESS

This application is a streamline continuation of Ser. No. 853,168 filed Aug. 26, 1969, now abandoned.

The present invention relates to an improved apparatus for controlling a mass flow rate of liquid in a chemical process.

Recently, in the chemical industry wherein remarkable progress in chemical engineering has been accomplished, a marked tendency to acquire very precise automatic control of process temperature, pressure, flow rate, and certain process variables etc., has been recognized. For example, in the case of carrying out automatic control for supplying a catalyst to a reaction, a precise measurement of mass flow rate of liquid in the process is required. The measuring of the mass flow rate of liquid in the chemical process is conventionally carried out by applying a throttle valve, and flow meters including a volumetric type or area flow type meter etc. However, in the above-mentioned conventional method, the mass flow rate can not be measured directly, and, further, it is impossible to prevent the occurrence of error caused by variations of characteristics of the flowing substance in accordance with variations of the measuring condition, and by variations of setting conditions of the automatic control system. Therefore, these conventional measuring methods are not satisfactory for carrying out very precise automatic control of a chemical process. A combined mechanism of a gear pump with a change gear, and other positive displacement type pumps etc., can be used for supplying liquid at a constant rate. However, this equipment can not satisfy the above-mentioned present demand, because of the distinct error caused by a certain variation of the process conditions in supplying the fluid at constant rate or of a ripple of a fluid stream in the chemical process. Many attempts for improving direct measuring of the mass flow rate of liquid have been tried in an attempt to solve the above-mentioned problems. For example, one of these attempts was to develop a device for measuring an instantaneous value of the mass flow rate directly. Flow meters such as loop type, repulsive plate type and Target type flow meters, are typical meters belonging to this kind of device.

A measuring device applying a combination of a volumetric type flow meter provided with means for connecting a direct measured value into a mass flow rate is another available type. The typical one of this latter type is a differential pressure type flow meter utilizing means for detecting liquid differential pressure across the orifice plate, and/or temperature, and/or density measuring devices are incorporated so that output signals thereof work to compensate for the output signal of the main flow meter.

However, it is well known that the above-mentioned two types of flow meters can not be used satisfactorily, because the range of precise measuring is practically limited. That is, in the above-mentioned types of flow meters, the measuring range is restricted by influences caused by the conditions of viscosity, specific gravity, coagulating property, corrosive property, temperature or pressure of the liquid, and suspended materials in the liquid. Further, it is said that the measuring accuracy, which determines the resultant performance of flow control system, is restricted to 1 percent, practically.

The principal object of the present invention is to provide an improved apparatus for measuring mass flow rate of liquid in a chemical process whereby the above-mentioned drawbacks are completely eliminated.

Another object of the present invention is to provide an apparatus for automatically controlling a liquid at a constant flow rate wherein a precise method and device for measuring a mass flow rate of a liquid is included.

A further object of the present invention is to provide an apparatus for measuring a mass flow rate of a liquid so that the supplying or discharging of the fluid into or from equipment of a chemical process can be automatically and precisely controlled at a constant flow rate, respectively.

A still further object of the present invention is to provide a precise apparatus for measuring a mass flow rate of a liquid under particular conditions differing from atmospheric temperature and pressure, in case an automatic control of a mass flow rate of a liquid is required in a chemical process.

Further features and advantages of the invention will be apparent from the ensuing description with reference to the accompanying drawings to which the scope of the invention is in no way limited.

Generally, in chemical processes, composition or characteristic features of liquid, and temperature or pressure of the liquid etc., are maintained substantially constant over a comparatively short period. Consequently, it is understood that the substantial mass flow rate of liquid in a chemical process can be maintained substantially constant for a short time within a few minutes, even though a pump having a constant flow rate capacity or a volumetric control system for controlling the flow rate is applied. Therefore, a precise method for measuring a mass flow rate, in other words, a precise automatic control of a mass flow rate at a constant condition can be carried out by means of coinciding an average flow rate in the above-mentioned short period with a required instantaneous value of the mass flow, and by means of preventing a variation of the average flow rate over a period of time. As mentioned above, in the automatic process control system utilizing a novel method for measuring a mass flow rate, firstly, the average value of the mass flow is measured at intervened times in a comparatively short period, then a difference between the average value and the required set value is calculated and the input of the automatic control system for controlling the flow rate of the pump or volumetric control equipment is automatically regulated in accordance with the above-mentioned difference, whereby a superior automatic control effect can be obtained. In the case of measuring a mass flow rate of liquid by means of the above-mentioned method, it is required to avoid the effect of noise at a time of measuring an instantaneous value. Therefore, it is desirable to calculate an integral value of the mass flow rate of liquid during a certain period by means of calculating a weight factor together with a time factor, because these factors can be most easily and precisely measured. Furthermore, the transformation and operation are carried out in digital form so that the high accuracy of the measurement can be maintained.

Therefore, the method for controlling the flow rate of the chemical process, utilizing the above-mentioned measuring method of a mass flow rate according to the present invention, comprises the following steps:

1. an average mass flow rate ($G$) is calculated by applying one of the following procedures;
   a. measuring a mass ($W$) of liquid being supplied to or discharging from a measuring device in a certain variable time interval ($T$), and calculating the mass flow rate ($G$) by an equation $G = W/T$,
   b. measuring a mass ($W$) of liquid being supplied to or discharging from the measuring device in a predetermined fixed time interval ($T$), and calculating the mass flow rate ($G$) of liquid by the same equation $G = W/T$,
   c. measuring the time ($T$) required for supplying or discharging a predetermined mass ($W$) of liquid to or from a measuring device and calculating an average mass flow rate ($G$) from the measured time interval ($T$) by the following equation $$G = W/T.$$

Therefore, it is understood that the average mass flow ($G$) is inversely proportional to the time interval ($T$) and, in another expression, the above-mentioned relation is represented as $$G \sim 1/T.$$

In case of (c), it is preferable to apply digital signals for carrying out the control system, in order to keep the measuring accuracy.
2. The average mass flow rate ($G$) is compared with a reference input of the control system at each time of the measuring so that a difference between ($G$) and the reference input is obtained.
3. The flow rate of liquid in the process is automatically controlled in accordance with the above-mentioned difference designated in the paragraph (2). For example, the internal pressure of the measuring device is regulated by a signal corresponding to the above-mentioned difference so that the flow rate of liquid in the process is automatically controlled in an accurate manner. As mentioned above, the internal pressure of the measuring device is preferably used as an energy source for manipulating liquid of the process. In other words, the internal pressure can be utilized as a manipulated variable for controlling the mass flow rate of liquid in the process, whereby the ripple of the liquid in the process can be satisfactorily prevented. The measuring device is preferably formed as a jacketed tank, and the net weight of the tank is restricted to a light weight so as to obtain precise data, without having to consider process conditions such as liquid temperature or pressure.

Therefore, an embodiment of the present control system comprises a device for controlling a flow rate for a very short period at almost constant conditions (hereinafter referred to as an automatic control device), a measuring device comprising a supplying conduit and a discharging conduit and a container connected to these conduits so as to measure an increased or decreased quantity of liquid therein at a precise condition (hereinafter referred to as a device for measuring a mass flow rate), means for closing or opening or actuating the above-mentioned conduits by an actuating signal (hereinafter referred to as the conduit actuating devices), an arithmetic unit for calculating an average mass flow rate of liquid from the measured data ($T$) and an output ($W$) of the device for measuring a mass flow rate during the above-mentioned time interval ($T$), (hereinafter referred to as an arithmetic unit), means for comparing the reference input of a mass flow rate of liquid and the measured data corresponding to the output of the arithmetic unit whereby the constant flow rate device can be controlled by the output thereof (hereinafter referred to as a comparator), means for transmitting required signals to the above-mentioned elements so that each element of the controlled system is actuated in accordance with each predetermined program (hereinafter referred to as a control device).

The above-mentioned automatic control system of a mass flow rate of liquid may be applied for controlling the flow rate of the supplying liquid to certain equipment, or for controlling the flow rate of discharging liquid from certain equipment. To simplify the following illustration, the former control system is hereinafter referred to as "automatic control system of a mass flow rate of supplying liquid," and the latter, "automatic control system of a mass flow rate of discharging liquid."

The embodiments of the automatic control systems of the above-mentioned two types according to the present invention are illustrated by way of the attached drawings.

Figure 1:
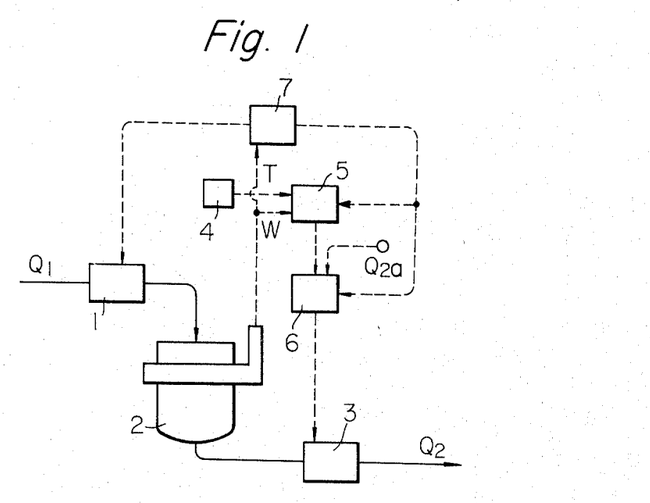
FIG. 1 is a diagrammatic view of an automatic process control system for controlling a flow rate of supplying fluid, wherein an improved method for measuring a mass flow rate is applied according to the present invention.
Figure 3:
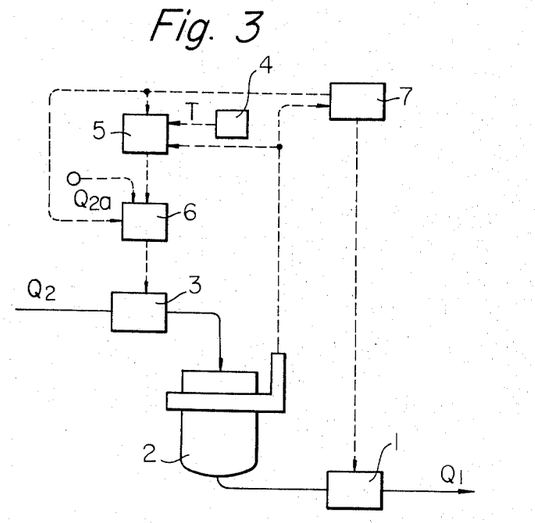
FIG. 3 is a diagrammatic view of an automatic process control system for controlling a flow rate of a discharging fluid wherein an improved method for measuring a mass flow is applied, according to the present invention.

In FIGS. 1 and 3, similar components are represented by the same numerical representations, that is, an actuating device of the supplying conduit is represented by 1; a measuring device of mass flow rate, 2; an actuating device of discharging conduit, 3; means for measuring a time interval or time signal generator, 4; an arithmetic unit, 5; a comparator, 6; and a control device, 7. The measuring device 2 is provided with a liquid container.

Figure 2:
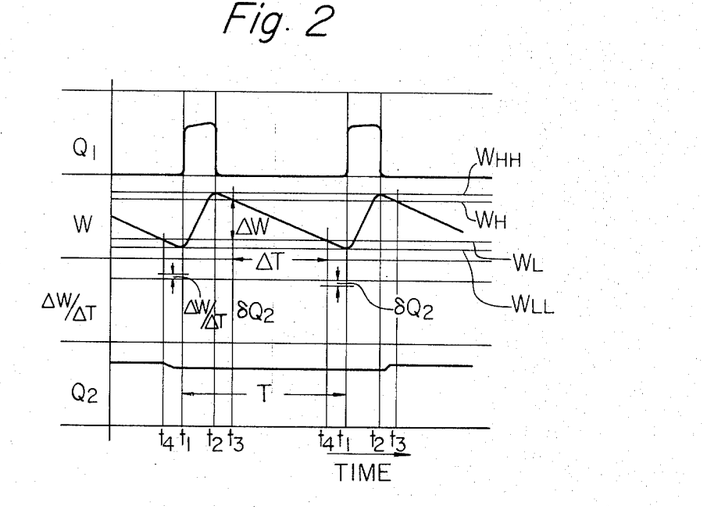
FIG. 2 is an explanatory diagram showing a variation of mass flow rate of the automatic control systems shown in FIG. 1, in accordance with lapse of time.

Referring to FIGS. 1 and 2 showing an automatic control of the mass flow of a supplying fluid, the actuating device 3 of a discharging conduit operates to control a flow rate of the liquid in the discharging conduit at a constant condition. The quantity ($W$) of the liquid contained in a container of the measuring device 2 decreases while the actuating device 1 closes the supplying conduit, and when the quantity of the liquid in the container becomes $W_L$, the arithmetic unit 5 receives the signal $W_L$ at a time represented by $t_4$ in FIG. 2. When the quantity ($W$) is further decreased and becomes $W_{LL}$ at a time of $t_1$, the control device 7 actuates the actuating device 1 so as to open the supplying conduit or drive a pump for supplying liquid to the measuring device 2.

If the flow rate $Q_1$ of the supplying conduit is greater than the flow rate $Q_2$ of the discharging conduit of the process, even though the supplying fluid into the measuring device 2 is continued and the actuating device 3 permits a constant flow rate of liquid in the discharging conduit, the quantity ($W$) of the liquid in the measuring device 2 tends to increase; therefore, when the quantity ($W$) of the liquid in the measuring device 2 becomes $W_{HH}$ at a time of $t_2$, the control device 7 operates to close the supplying conduit by way of the actuating device 1. Therefore, the quantity ($W$) of the liquid in the measuring device 2 starts to decrease and the signal $W_H$, an instantaneous output of the device 2, is fed to the arithmetic unit 5 at a time $t_3$ when the quantity ($W$) of the liquid in the measuring device 2 becomes $W_H$. Since the quantity ($W$) of the liquid continues to decrease and after the lapse of time represented by $\Delta T$, the quantity ($W$) of the liquid becomes $W_L$, a signal $W_L$, an instantaneous output of the device 2, is fed to the arithmetic unit 5 at a time $t_4$. The arithmetic unit 5 calculates an average mass flow ($W_H - W_L)/\Delta T$, and an output of the arithmetic unit 5 is fed to the comparator 6 whereby a difference $\delta Q$ between a reference input of the control system, and the output $\Delta W/\Delta T = Q_2$ ($W_H - W_L = \Delta W$) is detected. Then, a control signal, which is an output of the comparator 6, is fed to the actuating device 3. Therefore, the working condition of the actuating device 3, is regulated so as to respond to a manipulated value corresponding to $\delta Q$ and maintains its condition until the succeeding control signal is fed from the comparator 6. In the above-mentioned control operation, when the value of $\delta Q$ is positive, the flow rate $Q_2$ of the actuating device 3 is compensated to a value corresponding to $\delta Q$ in the negative direction, while when the value of $\delta Q$ is negative, vice versa. The above-mentioned control operation is repeated at each time of measuring the mass flow rate ($G$) with a time interval ($T$). However, the time interval ($T$) is not constant because the variation of many factors such as $Q_1$. Generally, it is preferably understood that $\Delta W = W_H - W_L$ is predetermined and fixed at a constant so as to make the measuring condition of the container constant and the time $\Delta T$ is measured. This type of measuring method and device can be easily understood by the following embodiments shown in FIGS. 5 and 6A, 6B, 6C, 6D, 6E, 6F and 6G. In this first embodiment (as shown in FIG. 2), the values $W_{HH}$ or $W_{LL}$ are set at their outside positions beyond $W_H$ or $W_L$, respectively, to avoid the undesirable influence caused by the dynamic characteristics of the actuating device 1. Corresponding times to the outputs $W_{HH}$, $W_{LL}$ of the measuring device 2 are represented by $t_2$ and $t_1$, respectively. Actually, the measuring accuracy of $\Delta W$ is 1/2,000; that of $\Delta T$, 1/2,000; $\Delta W/\Delta T$, 1/1,000.

The above-mentioned automatic control method has several practical features illustrated as follows.

1. The above-mentioned control system can be operated without any undesirable influences caused by the characteristic features of the liquid, particularly, such as viscosity, specific gravity, suspension etc. It is possible to apply the present control system for controlling the flow rate of liquid having high viscosity such as 5,000 poise.

2. The automatic control action to control liquid flow in a range from a very large value to a very small value can be practically applied according to the present invention.

3. Actions to compensate for variations caused by temperature or pressure of the liquid or atmosphere are not required to carry out the present control operation.

4. Since the difference of the liquid weights in the container of the measuring device 2 at two separated instants is measured, there is no influence of the weight of the substance adhered to the container, or variations of weight of the container caused by corrosion.

5. Since the measuring of the weight differences of the liquid contained in the container is repeated at very short time intervals, very precise and reliable control action can be realized.

Figure 4:
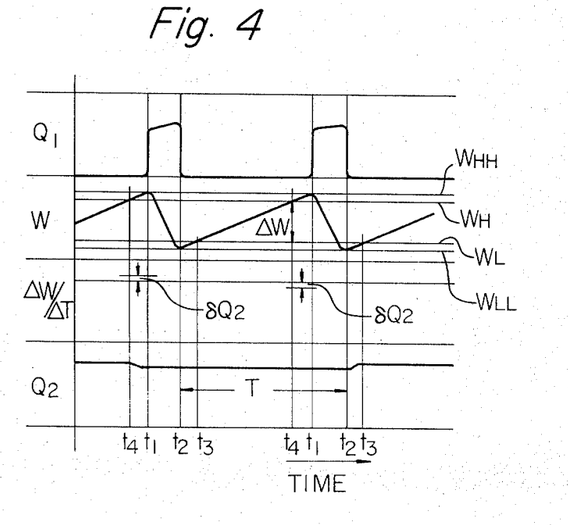
FIG. 4 is a similar diagram as FIG. 2, showing a variation of mass flow of the automatic control system shown in FIG. 3.

In FIG. 3, an embodiment of the present control system applied for controlling a flow rate of liquid being discharged from equipment of a chemical process is shown. The operative characteristic of the components of the control system is shown in FIG. 4. However, as shown in FIGS. 3 and 4, almost similar control action is carried out, and a similar control effect is obtained as compared to the first embodiment shown in FIGS. 1 and 2, even though, in this embodiment, the positions of the actuating devices 1 and 3 are reversed, and the measuring device 2 measures the opposite phenomena of the quantity ($W$) of the fluid in the as compared to the first embodiment.

In the above-mentioned two embodiments, an automatic regulating valve is used as an actuating device 1, however, a gear pump may be used so as to generate a sufficient pressure for making a smooth liquid stream in the conduit of the process instead of the regulating valve. A crystal oscillator or diapason vibrator may be used for generating an output pulse for measuring the elapsed time, whereby a very precise measurement of the elapsed time can be easily carried out. An optimum measuring interval ($T$) can be calculated with reference to the stability and required accuracy of the actuating device 3, the flow rate $Q_2$ of the conduit, the preciseness and response characteristics of each component, and, the optimum condition of the flow rate $Q_1$ of the supplying conduit with relation to the flow rate $Q_2$ of the discharging conduit can also be decided in accordance with the above-mentioned data. With respect to the arithmetic unit 5, if the value of $\Delta W$ is fixed, the value of $\Delta W/\Delta T$ can be obtained by only measuring $\Delta T$; consequently, the operation for obtaining the value of $(W_H - W_L)$ can be omitted. If the value of $\Delta T$ is fixed, the value of $\Delta W/\Delta T$ can be easily obtained by only measuring $\Delta W$.

An automatic control system, wherein the value $\Delta W$ is fixed and only the time $\Delta T$ required to reduce the weight of fluid contained in the container is measured, is shown in FIGS. 5 and 6A, 6B, 6C, 6D, 6E, 6F and 6G.

Figure 5:
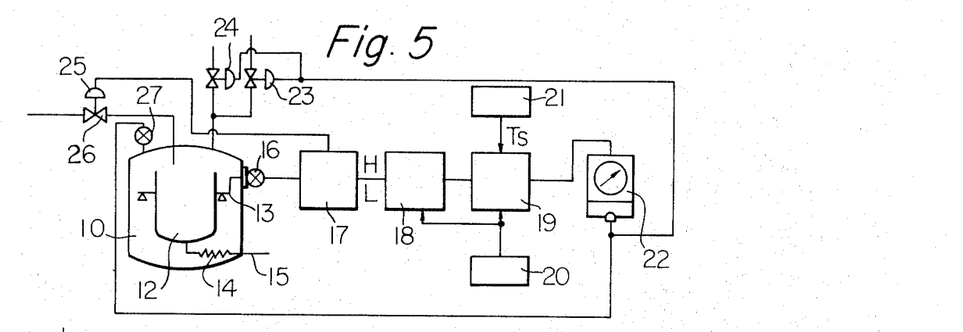
FIG. 5 is a diagrammatic view of another process control system for controlling a flow rate of a liquid wherein an improved device for measuring a mass flow is applied, according to the present invention.
Figure 6A:
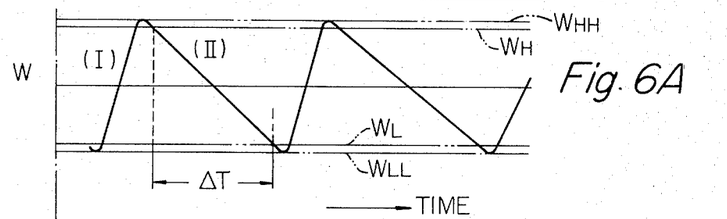
FIGS. 6A, 6B, 6C, 6D, 6E, 6F and 6G are explanatory diagrams showing relations between the performance of a mass flow rate control system shown in FIG. 5 and the performance of each element of the apparatus.
Figure 6B:
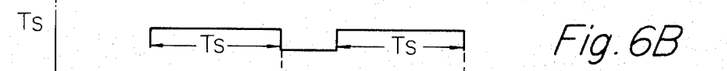
Figure 6C:
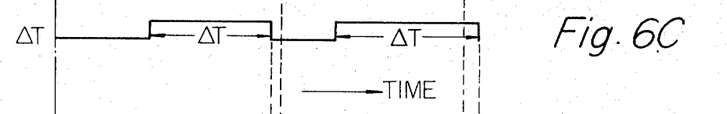
Figure 6D:
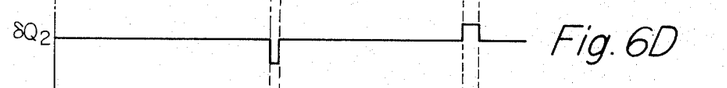
Figure 6E:
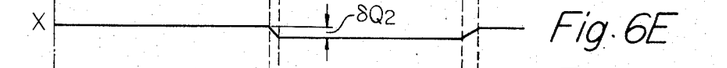
Figure 6F:
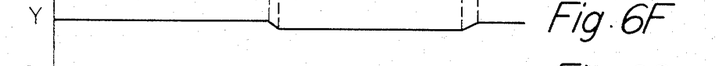
Figure 6G:
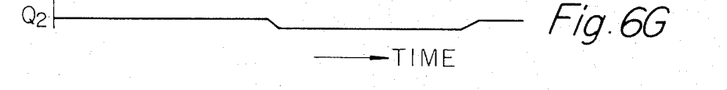

In FIG. 5 and FIGS. 6A 6B, 6C, 6D, 6E, 6F and 6G, showing another embodiment of the control system of the invention, the measuring means comprises an inside container 12 and an outside container 10 surrounding the inside container 12 and a measuring device 13. Referring to FIG. 6A, the ordinate represents a mass of fluid ($W$) contained in the inside container 12, and the abscissa represents the elapsed time. The output of the measuring device 16 is fed to a control device 17 provided with an actuating means having a dead zone for transmitting an actuating signal to an actuating device 25 mounted on a supplying conduit 26. The dead zone coincides with a range between values of $W_{HH}$ and $W_{LL}$ (FIG. 6A). When the value of the quantity ($W$) reaches to $W_{HH}$, the actuating device 25 of the supplying conduit 26 is closed, and when the value of quantity ($W$) reaches $W_{LL}$, the actuating device 25 is opened. The fluid supplied to the inside container 12 is discharged through a restriction orifice 14 mounted on a discharging conduit 15. The above-mentioned discharging condition is represented by a curve II in FIG. 6A, while the supplying condition is represented by a curve I. A time interval $\Delta T$, which corresponds to an interval of time when the quantity ($W$) becomes $W_H$ and $W_L$, is measured by a time measuring device 18, and a reference input, or a standard time $T_S$, which is an output of a time setting adjuster 21, whereby the reference input is predetermined, is compared with the measured time interval $\Delta T$ by means of a comparator 19. And when the reference input $T_S$ is larger than the measured time interval $\Delta T$, in other words, the predetermined flow rate is smaller than the measured flow rate, a set point (X) of a pressure regulator 22 is adjusted by an output signal of the comparator 19 to a smaller value which corresponds to $\delta Q$, and when $T_S$ is smaller than $\Delta T$, the set point of the pressure regulator 22 is adjusted in an opposite way. Since the discharging flow rate $Q_2$ from the inside container 12 is in a proportional relation with an inside pressure of the outside container 10, the flow rate $Q_2$ of the inside container 12 can be precisely controlled by adjusting the inside pressure of the outside container 10 by way of adjusting the inside pressure (Y) of the outside container 10. The inside pressure (Y) is regulated by changing the set point of the pressure regulator 22 by way of operating a pressure control actuator 23 which is mounted on a conduit connecting a pressurized gas supply source (not shown) with the outside container 10, while another pressure control actuator 24 is mounted on a conduit for discharging gas from the outside container 10 when the inside gas pressure of the container 10 is higher than a predetermined value. The pressure regulator 22 operates to actuate, alternatively, the pressure control actuators 23 or 24 in accordance with a difference between an output of a pressure transmitter 27 detecting the inside pressure of the outside container 10 and the set point (X) thereof. For example, when the inside pressure of the container 10 is lower than a predetermined value, the pressure control actuator 23 is opened so as to supply a gas or air into the outside container 10 for increasing the inside pressure thereof. When the inside gas pressure of the outside container 10 is higher than a predetermined value, the actuator 24 is opened to discharge gas from the outside container 10. A standard pulse generator 20 is disposed to this control system so as to synchronously actuate the time measuring device 18, comparator 19, and time measuring device 21.

Figure 7:
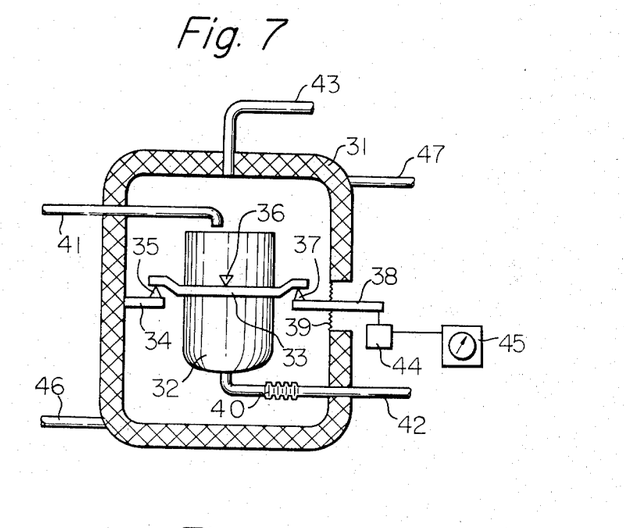
FIGS. 7 and 8 are diagrammatic views of improved devices for measuring a mass flow rate under particular conditions differing from atmospheric temperature and pressure, so that a superior automatic control of a flow rate of liquid in a chemical process can be carried out, according to the present invention.

In the above-mentioned embodiments, a novel device for measuring a mass flow rate of the liquid is applied. The detailed construction of this device is shown in FIG. 7. In FIG. 7, the measuring device utilized for the invention comprises an outside container 31 provided with a jacket for the heating or cooling thereof. An inside container 32 is enclosed in the outside container 31 and supported by a weighing mechanism comprising a horizontal supporting rod 33 for supporting the inside container 32, a horizontal arm 34 secured to an inside wall of the outside container 31, a fulcrum 35 mounted on the horizontal arm 34, a pair of supporting fulcrums 36 secured to the outside symmetrical position of the inside container 32, a diaphragm sealing lever 38 provided with a fulcrum 37 supporting an end portion of the horizontal supporting rod 33, and a diaphragm 39 mounted on the outside container 31 as shown in FIG. 7 and supporting the diaphragm sealing lever 38 whereby the lever 38 can be moved around the diaphragm 39 so that the diaphragm 39 works as a fulcrum of the lever 38. A transmitter 44 is connected to an end portion of the diaphragm sealing lever 38 so that the unbalanced condition of the lever 38 can be detected. The operating position of the transmitter 44 to the lever 38 is decided so as to correspond to the dynamic point of the fulcrum 37. A flexible conduit 40 is used in a portion of a discharging conduit 42 so that even when the inside container 32 is displaced in an upward or downward direction, there is no trouble in carrying out the measuring operation. A supply conduit 41 passes through the outside container, and a pressure conduit 43 is connected to an uppermost portion of the outside container 31 and is also connected to a pressure gas supply source (not shown), and conduits 46 and 47 are supply or discharge conduits for supplying or discharging a heating or cooling agent into or from a conduit enclosed in the outside container, respectively. An indicator 45 for weighing is connected to the transmitter 44.

The principal idea of the above-mentioned measuring device is illustrated as follows. The inside pressure of the outside container 31 is adjusted by supplying or discharging gas by way of the conduit 43, and the inside temperature is also adjusted by way of the jacket of the outside container 31 so as to conform with the operating condition.

Liquid is supplied into the inside container 32 through the supplying conduit 41, and the conduit 41 is then closed by a conventional means such as a valve (not shown). The discharging conduit 42 is also closed by conventional means before supplying the liquid. The weight of the liquid contained in the container 32 together with the container 32 is transmitted to the horizontal supporting rod 33 through a fulcrum 36, so that the corresponding force is transmitted to the fulcrum 37 as the fulcrum 35 is fixed. The force transmitted to the fulcrum 37 is transmitted to the transmitter 44 by way of the lever 38, and the transmitted force or displacement is then transferred converted into an electrical or pneumatic signal. This signal is indicated by the indicator 45. Since the inside container 32 receives balanced pressure from its outside and inside, a strong and heavy construction is not required. After completion of the measurement, the liquid contained in the inside container 32 is discharged through the discharging conduit 42. The above-mentioned construction of the measuring device may be modified in accordance with the size of the container, and working condition etc. Further, it is preferable to use a force balance type transmitter 44 so as to obtain very precise data.

In the case of utilizing the above-mentioned measuring device in the embodiments shown in FIGS. 1, 3 and 5, the supplying conduit 41 must be provided with an automatic actuating means for opening or closing the conduit 41, the discharging conduit 42 must be always maintained at an opened condition so as to discharge the liquid at a constant flow rate, and the conduit 42 may be provided with an automatic regulator, whereby the flow rate of the discharging conduit 42 can be automatically controlled. Therefore, the mass flow rate of the liquid contained in the inside container 32 can be precisely measured.

Figure 8:
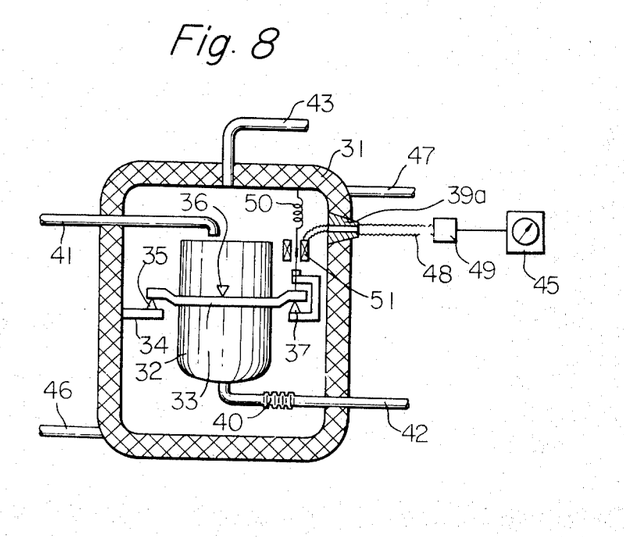

Referring to FIG. 8, in the case where the mass flow rate is measured by utilizing an electric transmitter, other elements except this electric transmitter are almost the same as the embodiment shown in FIG. 7. That is, the measuring device shown in FIG. 8 is provided with a lead wire 48, an insulation plug 39a inserted into the outside container 31 whereby the lead wire 48 is rigidly supported, a differential transformer 51 provided with an iron core connected at its bottom end with an end portion of the horizontal supporting rod 33, and a balancing spring 50 connected at its bottom end with the iron core and supported at its top end with the outside container 31. A self balancing transmitter 49 is connected to the lead wire 48. The principal idea of this type of measuring device is illustrated as follows; the load is transmitted to the fulcrum 37 so that an iron core of the differential transformer 51 is pulled in a downward direction until the load is balanced with the balancing spring 50. This balanced position proportionates to the load so that the balanced position is transferred into an electric signal which can be measured by the indicator 45.

In a case where the chemical process is operated under a particular condition of temperature or pressure differing from normal atmospheric temperature or pressure, the net weight of the container is larger than that of the liquid contained in the container because the container must be provided with a thick cell or a particular device for heating or cooling. However, even in the above-mentioned case, very precise control of a mass flow rate can be attained by utilizing the measuring device illustrated in FIGS. 7 and 8. Further, even in case of processing corrosive liquid, wherein a special material must be used to protect portions which the liquid contacts directly, the quantity of the specified material can be reduced by applying the above-mentioned measuring device. Consequently, the equipment cost of the automatic control of the mass flow rate of liquid of the chemical process can be reduced.

Thus, in part, the apparatus of the invention can be regarded as a major open control loop. With reference to FIG. 1, the control loop is composed of elements 2, 4, 5, 7, 6, and 3, and performs a flow rate control action. For example, the entire system can be summarized as follows.

The output ($\Delta W/\Delta T$) from the elements 4, 5 and 7 is brought into the comparator 6 and, therein, compared with a reference input ($Q_{2a}$). After this comparison, the comparator 6 emits an instruction signal, e.g., $f(\Delta W/\Delta T)$, which is a factor of the deviation of ($\Delta W/\Delta I$) from $Q_{2a}$. Upon reception of this instruction signal $f(\Delta W/\Delta T)$, the actuating device 3 adjusts the rate of flow passing therethrough.

Therefore, as described above, measurement of the mass flow rate is carried out continuously over a prescribed length of time, and the control is based on a mean value of these measured mass flow rate magnitudes. In other words, deviations of the time-average flow rate ($\Delta W/\Delta T$) from the reference input $Q_{2a}$ are sensed and used for adjustment of the actual flow rate through the actuating device 3.

We claim:

1. In an apparatus for controlling the mass flow rate of a liquid in a chemical process, an improvement comprising a liquid measuring device, means defining input and output liquid passages connected to said measuring device, first automatic control means for controlling the flow rate of liquid through one of said input and output passages in response to an actuating first signal, second automatic control means for automatically controlling the flow rate of liquid in the other of said input and output passages in response to an actuating second signal, calculating means connected to said measuring device for calculating an average mass flow rate of liquid from a weight difference of liquid within said measuring device during a time interval and having output means for producing a third signal indicative of said average mass flow rate, comparator means having said third signal output means connected thereto and having input means for receiving a reference signal indicative of a reference mass flow rate and including means for detecting a deviation between said third signal and said reference signal and providing a corresponding output signal comprising said actuating second signal and applying same to said second control means to accordingly control the average mass flow rate of liquid, and programmer means having input means connected to said measuring device for generating said actuating first signal and for generating output signals and applying same to both said calculating and comparator means for actuating said first automatic control means, calculating means, and comparator means in accordance with a predetermined program.

2. An improved apparatus for controlling a mass flow rate of liquid according to claim 1, wherein said measuring device comprises a container having said input and output passages connected thereto, and a weighing mechanism supporting said container and including means for generating signals indicative of said weight difference of liquid.

3. An improved apparatus for controlling a mass flow rate of liquid according to claim 2, wherein said means for calculating an average mass flow rate of liquid comprises measuring means connected to said weighing mechanism for measuring net weights of liquid contained in said container together with net weight of said container at suitable intervened times, an arithmetic unit for automatically calculating a value of an average mass flow rate = (weight difference between two measured weights obtained by said measuring means) / (time interval between weighing instants).

4. An improved apparatus for controlling a mass flow rate of liquid according to claim 3, wherein said container is encased in an outside container which is sealed to satisfy set conditions of operating temperature and pressure, said measuring means for measuring net weight of liquid together with net weight of said container is disposed in said outside container, and said arithmetic unit is disposed outside of said outside container for receiving an output signal of said measuring means.

5. An improved apparatus for controlling a mass flow rate of liquid according to claim 2, wherein said means for calculating an average mass flow rate of liquid comprises means for measuring a time interval corresponding to a predetermined weight difference of liquid contained in said container measured by said weighing mechanism at two different measuring instants, and an arithmetic unit for automatically calculating a value of an average flow rate = (said weight difference) / (output of said means for measuring a time interval).

6. An improved apparatus for controlling a mass flow rate of liquid according to claim 2, wherein said means for calculating an average mass flow rate of liquid comprises measuring means connected to said weighing mechanism for measuring net weights of liquid contained in said container together with net weight of said container at predetermined intervened times, and an arithmetic unit for automatically calculating a value of an average mass flow rate = (weight difference between two measured weights obtained by said measuring means) / (said predetermined time interval).

7. An improved apparatus for controlling a mass flow rate of liquid according to claim 6, wherein said container is encased in an outside container which is sealed to satisfy set conditions of operating temperature and pressure, said measuring means for measuring net weight of liquid together with net weight of said container is disposed outside of said outside container, and said arithmetic unit is disposed outside of said outside container for receiving an output signal of said measuring device.

8. An improved apparatus for controlling a mass flow rate of liquid according to claim 1, wherein said measuring device comprises an inside container, an outside contained encasing said inside container, and a weighing mechanism supporting said inside container in said outside container, said input passage comprises a supply conduit passing through a wall of said outside container and connected to said inside container, and said output passage comprises a discharging conduit passing through a wall of said outside container and connected to a bottom portion of said inside container.

9. An improved apparatus for controlling a mass flow rate of liquid according to claim 1, wherein said measuring device comprises a liquid container having a sealed gas phase portion and said other passage means comprises a first connecting conduit means for connecting said sealed gas phase portion of said liquid container with an air pressure source disposed outside of said liquid container, and a second conduit means for connecting said gas phase portion of said liquid container with atmosphere, and wherein said second automatic control means includes a first pressure control actuator mounted on said first connecting conduit means and a second pressure control actuator on said second conduit means, said first pressure control actuator and said second pressure control actuator are connected to said signal output means of said comparator means for being actuated alternatively in accordance with said actuating second signal.

10. In an apparatus for controlling the mass flow rate of a liquid in a chemical process, an improvement comprising a liquid measuring device, means defining input and output liquid passages connected to said measuring device, first automatic control means for controlling the flow rate of liquid through one of said input and output passages in response to an actuating first signal, second automatic control means for automatically controlling the instantaneous flow rate of liquid in the other of said input and output passages and including means for selectively compensating for instantaneous fluctuations in the liquid flow rate in the other of said passages, calculating means connected to said measuring device for calculating the average mass flow rate of liquid from a weight difference of liquid within said measuring device during a time interval and having output means for producing a second signal indicative of said average mass flow rate, comparator means having said second signal output means connected thereto and having input means for receiving a reference signal indicative of a reference mass flow rate and having means for detecting a deviation between said second signal and said reference signal and providing a corresponding actuating third signal and applying same to said second automatic control means for actuating said second control means to control the instantaneous mass flow rate of liquid, and programmer means having input means connected to said measuring device for generating said actuating first signal and for generating output signals and applying same to both said calculating and comparator means for actuating said first automatic control means, calculating means and comparator means in accordance with a predetermined program.

11. An improved apparatus for controlling a mass flow rate of liquid according to claim 10, wherein said measuring device comprises a liquid container having a sealed gas phase portion and connected to said input liquid passage for receiving therefrom the liquid and connected to said output liquid passage for delivering thereto the liquid from said liquid container, and wherein said second automatic control means includes first means for alternatively supplying and exhausting a pressurized gas to and from the interior of said sealed gas phase portion in accordance with a control signal to accordingly pressurized the liquid contained within said liquid container, pressure sensing means for sensing the pressure of the pressurized gas within said sealed gas phase portion and providing a corresponding output signal, and second means responsive to said output signal for developing an appropriate control signal whenever said output signal is above or below a predetermined range of values and applying same to said first means to accordingly control the supplying and exhausting of pressurized gas to said sealed gas phase portion to thereby effectively control the liquid pressure, whereby instantaneous fluctuations in the mass flow rate of the liquid are compensated for by selectively controlling the liquid pressure.

* * * * *